Aug. 19, 1969     W. H. BEATTIE     3,462,609
RADIATION SENSITIVE NUCLEI DETECTOR FOR SOLUTIONS
Filed Dec. 22, 1966
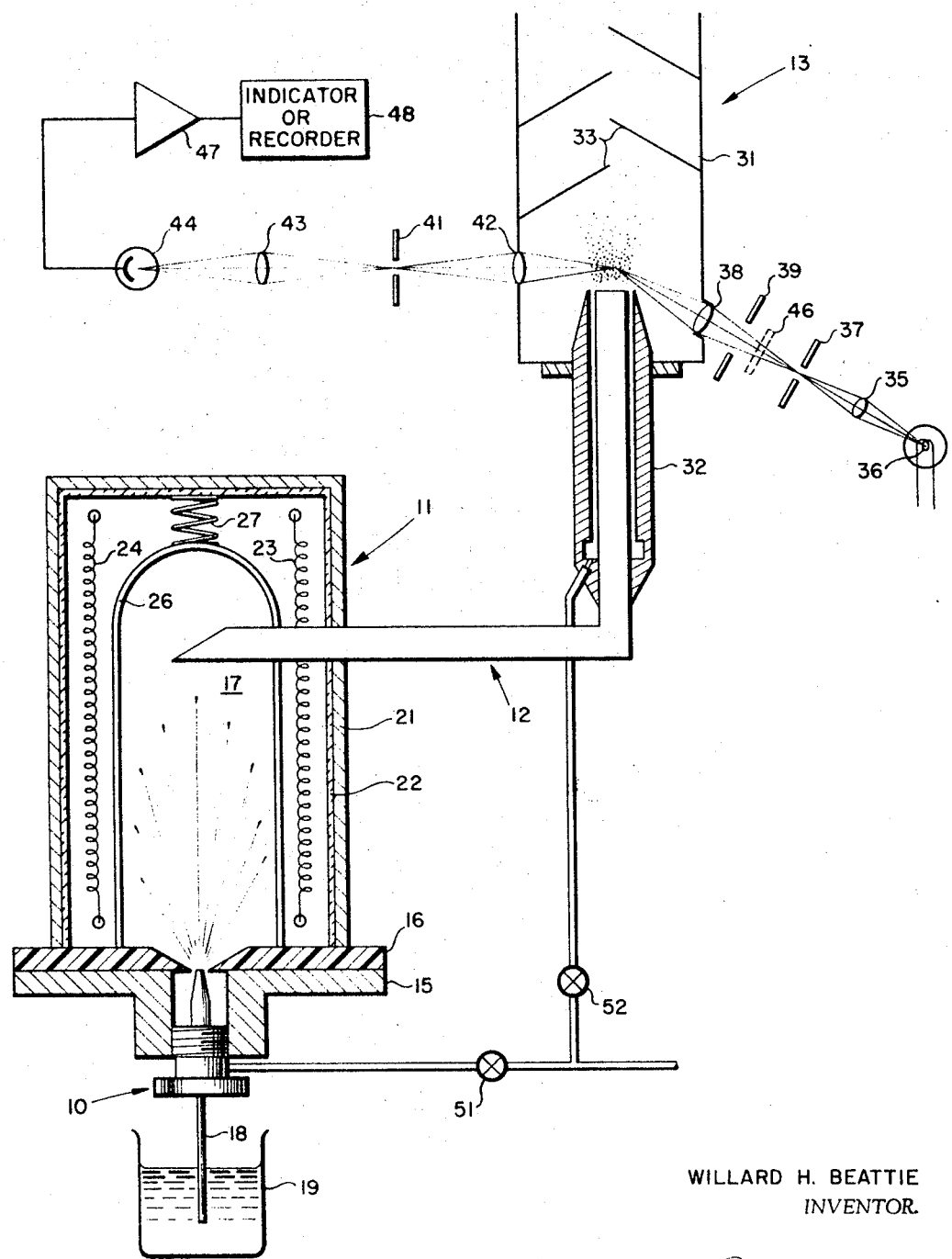
WILLARD H. BEATTIE
INVENTOR.
BY *Paul R. Harder*
ATTORNEY

United States Patent Office 3,462,609
Patented Aug. 19, 1969

1

3,462,609

RADIATION SENSITIVE NUCLEI DETECTOR FOR SOLUTIONS

Willard H. Beattie, Los Alamos, N. Mex., assignor to Beckman Instruments, Inc., a corporation of California Filed Dec. 22, 1966, Ser. No. 603,890
Int. Cl. G01n *21/26*
U.S. Cl. 250—218 2 Claims

ABSTRACT OF THE DISCLOSURE

A nonspecific, high sensitivity detector capable of measuring concentration of dilute solutions in the part per million range is disclosed which takes advantage of the condensation nuclei principle by condensation of solvent vapor upon an aerosol of solute nuclei. The apparatus consists of an evaporator into which a solution is atomized and the solvent evaporated, a condenser for condensing the solvent vapor upon the solute nuclei and an aerosol nephelometer for detecting the enlarged particles.

DISCLOSURE

This invention relates to a nonspecific, high sensitivity detector capable of measuring concentrations of dilute solutions in the parts per million range and more particularly to a condensation nuclei detector for the measurement of concentraitons of solutions.

When a vapor is cooled to or slightly below its dew point, i.e., the temperature where the vapor pressure becomes equal to the partial pressure, the vapor will condense if there is present any surface or foreign particle (called condensation nuclei) upon which this condensation may take place. These particles may be either liquid or solids and may be as small as 0.001 to 0.1 micron in diameter. In the absence of such surface, the vapor will supercool, i.e., the partial pressure becomes greater than the vapor pressure, and the atmosphere within which the vapor is located becomes supersaturated. The relative supersaturation required before self-nucleation occurs, i.e., the spontaneous condensation of the vapor without the presence of surfaces or condensation nuclei upon which to condense, is generally very high. For example, in the absence of condensation nuclei water vapor will reach a relative humidity of 420% (a relative supersaturation of 4.2) before self-nucleation occurs. In the presence of condensation nuclei the relative supersaturation required before condensation upon the nuclei will occur depends upon the radius of curvature of the particle. In any event, the degree of supercooling required for condensation upon a condensation nuclei is generally greatly decreased over that required for self-nucleation. In order to detect condensation nuclei extremely sensitive detectors are required. However, if these nuclei are present in a supercooled vapor the vapor will condense upon the nuclei increasing the particle diameter by a large factor and the enlarged particles may be readily observed by scattered light techniques. Although the determination of the presence of condensation nuclei by supercooling vapor and observing the enlarged particles by scattered light is known in the art, this detection technique has not heretofore been applied to solutions.

If a solution is composed of a solvent having a vapor pressure greater than the vapor pressure of the solute it is possible to disperse the solution as an aerosol and evaporate the solvent from the aerosol by increasing temperature. If the vapor pressure of the solute is low it will remain dispersed as a residue of extremely small particles which may form condensation nuclei. If the mixture of solvent vapor and solute condensation nuclei is subsequently cooled below the dew point of the solvent, the solvent vapor will condense upon the solute particles again forming an aerosol which can be observed by scattered light. A pure solvent treated in this manner must be cooled more than a solution before it will again form an aerosol. For any particular degree of cooling, the amount of aerosol formed will increase with the concentration of solution from which it is formed since more solute condensation nuclei are present. If the aerosol is detected by scattered light, the intensity of scattered light increases with the concentration of the solute.

2

For a better understanding of this invention reference is made to the following detailed description and the accompanying figure which is a schematic diagram of one preferred embodiment of this invention.

Referring now to the drawing, the condensation nuclei detector generally comprises an aerosol generator 10, an evaporator 11, a condenser 12 and an aerosol nephelometer 13.

The aerosol generator may be any suitable device for aspirating and atomizing a liquid sample. One such suitable device is the atomizer illustrated in FIG. 6 of U.S. Patent No. 2,714,833 to Paul T. Gilbert, Jr. This atomizer is generally shown in the figure and is provided with a suitable fitting and screwed into the base plate 15 of evaporator 11. The tip of the atomizer is preferably located near the level of the liner 16 of Teflon which forms the bottom of spray chamber 17 to protect the atomizer from excessive heat which could decrease its efficiency or damage the tip. Atomizers with small and medium bore capillaries have been found best suited for use with aqueous solutions. The atomizer is connected to any suitable source of carrier gas such, for example, as a supply of nitrogen, not shown. Although the evaporator and atomizer are arranged in the preferred embodiment to spray upward so that a straight capillary 18 may be inserted into the sample cup 19, it is also possible to spray sideways or downward without adverse effect.

Although one specific example of an atomizer has been illustrated the particular type of atomizer is not critical to the operation of the invention. Any atomizer may be utilized and a suitable alternative is the ultrasonic sample atomizer illustrated in U.S. Patent No. 3,325,976 to C. D. West.

The evaporator 11 may conveniently comprise a base plate 15 having thereon a liner 16 of Teflon. The base plate may be of any suitable shape and configuration for supporting the evaporation chamber. Secured to liner 16 in any suitable manner is a removable cover or can 21 lined with an insulating material 22 such as asbestos. The aluminum can may support a heating means such as heating coils 23 and 24. A Pyrex cylinder 26 closed at its upper end is pressed against liner 16 by a spring 27 positioned between the outer can and the cylinder 26. Cylinder 26 forms a heated spray chamber into which the solution is atomized.

The design of the evaporator illustrated in the preferred embodiment provides for easy disassembly for cleaning. The dimensions of the cylinder 26 are not critical but may conveniently be selected to conform to the dimensions of the emerging plume of spray from aerosol generator 10. If the spray chamber is made too small, spray from the aerosol generator will land on the surface thereof and evaporate. On the other hand, if the chamber is made too large then the response time of the system is unnecessarily increased. The cylinder 26 may be conveniently coated with a non-wetting material such, for example, as Teflon which also has the advantage of being chemically inert. Desicote also has been found suitable as a non-wetting agent. The heating coils 23 and 24 surrounding the chamber provide a temperature within the spray chamber 17 sufficient to evaporate the solvent leaving the small particles of solute as condensation nuclei. The mixture of vapor and condensation nuclei are carried by the carrier gas flow from the chamber through condenser 12.

Condenser 12 may conveniently comprise a tube having its inlet end located within the spray chamber 17 and cut at an angle to aid in preventing any large unevaporated droplets from leaving the spray chamber. The condenser tube interconnects the evaporator and the nephelometer. The condenser tube provides an area in which the vapor may be cooled below its dew point such that it will condense upon the solute condensation nuclei thereby forming enlarged particles or a fog or aerosol. In order to prevent over-cooling it may be necessary to insulate and/or heat the walls of the tube. If the vapor is cooled sufficiently to condense upon the walls a drain may conveniently be provided.

The aerosol nephelometer includes an observation chamber 31 which is sealed to prevent light or dust from entering the system. The condenser tube terminates within the observation chamber and is surrounded at its exit end by a second tube 32 which is also connected to the source of carrier gas. This arrangement provides a secondary stream of carrier gas surrounding the emerging stream of condensed aerosol. This secondary stream provides a sheath of dry gas to prevent the entire observation chamber from filling with fog which would cause stray light and condensation upon the walls and lenses of the chamber. It is generally desirable to have the velocity of the primary and secondary carrier gas streams substantially equal to minimize turbulence. The baffles 33 in the chimney above the observation chamber prevent room light from entering the observation chamber while allowing the carrier gas and fog to exit therefrom. Depending upon the sample the chimney may be vented to the atmosphere or to any suitable trap to remove the solute and/or solvent from the carrier gas prior to venting.

A lens 35 focuses an image of the filament 36 of a radiation source upon slit 37 and is arranged such that the slit is flooded with radiation. A second lens 38 is supported within the wall of the observation chamber and focuses an image of the slit at unity magnification at the center of the emerging areosol from condenser 12. The optical system is arranged such that the lower edge of the light beam is approximately ¼ inch above the end of the condenser tube. An aperture 39 is placed directly in front of lens 38 to decrease stray light by preventing the edges of lens 38 from being illuminated. The optical elements thus far referred to form an excitation or incident beam of radiation passing through the aerosol emerging from the condenser tube.

A scattered beam path is provided at an angle to the incident beam path. The angle between the incident and scattered beam paths may be any suitable angle although an angle of 90° minimizes stray light. Such an angle also allows operation of the detector, usually a photomultiplier, at its most sensitive point since the photomultiplier sees no light except stray light in the absence of sample. The scattered light beam path optics are similar to the incident beam optics and a virtual image of the slit 41 is focused at the center of the emerging aerosol stream by lens 42. Lens 43 focuses an image of the slit 41 upon the most sensitive region of a photomultiplier detector 44 or other suitable radiation detector.

The radiation source 36 may be of any suitable type but is preferably a tungsten lamp for providing white light. The lamp is arranged such that the filament coil is in a position to conform to the orientation of the slits. When white light is utilized, the various wavelengths are averaged by the spectral emittance of the lamp, the transmittance of the optical elements and the sensitivity of the phototube, giving an average wavelength for a tungsten lamp of approximately 500 millimicrons.

When relatively concentrated solutions are to be detected, scattering efficiency is high and some form of attenuation must be utilized. The simplest form of attenuation is the use of neutral filters such as neutral filter 46 located in the incident beam path. It is to be understood that the entire optical system is enclosed to prevent the entry of room or other stray light and all interior non-glass components and surfaces of the optical system, including the observation chamber, are blackened to minimize stray radiation. It may be desirable to provide a suitable beam trap, not shown, to trap the incident beam after it has passed the aerosol sample. The output of the photomultiplier is amplified at 47 and may be indicated and/or recorded at 48. While the optical system has been disclosed as having the scattered beam path at an angle to the incident beam path, other scattered light measuring systems, such as a dark field optical system may be utilized.

In operation, a source of suitable carrier gas is provided to the aerosol generator and to the secondary stream surrounding the aerosol stream emerging from the evaporator 12. The relative flow rates of the streams are adjusted by valves 51 and 52 to provide atomization at the desired rate and a nonturbulent flow at the condenser exit. A solution, the concentration of which is to be determined and in which the vapor pressure of the solvent is greater than the vapor pressure of the solute, is introduced to the sample cup and atomized into evaporation chamber 17. The evaporation chamber has been preheated to a temperature sufficient to vaporize the solvent but insufficient to vaporize the solute. A hot mixture of solvent vapor and small particles of solute which form condensation nuclei is formed within the evaporation chamber and swept by the carrier gas flow through the condenser 12. In the condenser 12 the temperature of the mixture is reduced below the dew point of the solvent a sufficient amount for the solvent to condense upon the condensation nuclei and reform an aerosol or fog. If the supply of carrier gas is free from foreign particles the vapor condenses only upon the solute condensation nuclei and the number of enlarged particles formed is directly proportional to the concentration of the sample. The output of the photomultiplier is thus also proportional to the sample concentration.

The invention may be utilized with both aqueous and non-aqueous solvents so long as the vapor pressure of the solvent is greater than the vapor pressure of the solute. While nitrogen has been disclosed as the carrier gas, filtered compressed air is equally suitable particularly for aqueous solutions although it may be hazardous when utilizing organic solvents. It has been found that commerically available tank nitrogen is generally sufficiently free of foreign particulate matter that filters are not necessary. The system has been found to be extremely sensitive and is capable of detecting less than one part per million of solute to solvent and is capable of detecting condensation nuclei as small as about 10 A.

Although the detector is nonspecific it has the advantages of being extremely low in cost, portable, highly sensitive, requires only small amounts of sample and is capable of operation in a continuously flowing system. Many uses for the solution condensation nucelei detector as hereinbefore described are obvious. The requirement for highly sensitive detectors, particularly in liquid chromatography, is well known. The present apparatus is quite useful in liquid-liquid partition chromatography so long as the detector is limited to unbuffered systems or systems with volatile buffers. The detector can also be utilized with liquid-solid absorption chromatography. Another field rapidly becoming important is gel permeation chromatography. Gel permeation chromatography provides a method for separating high polymers according to molecular size based upon the differential rate of migration of polymers in a gel. The polymer solutions are extremely dilute and detectors having very high sensitivity are required. The detector may further be utilized in the monitoring of the purity of a solvent or concentration of streams. The detector also finds application in monitoring the total impurities in boiler feed water or water hardness.

Obviously many modifications and variations of the present invention are possible in light of the foregoing teachings and it is to be understood that the invention may be constructed otherwise than as specifically described without departing from the spirit and scope of the appended claims.

What is claimed is:

1. A condensation nuclei detector for solutions in which the vapor pressure of the solvent is greater than the vapor pressure of the solute comprising:

atomizing means for atomizing a solution of a solute dissolved in a solvent into an aerosol stream;

a heated chamber connected to said atomizing means for evaporating the solvent in said aerosol stream to provide a stream mixture of solvent vapor and solute particles;

condenser means connected to said heated chamber for cooling said mixture so that said solvent vapor condenses on said solute particles to provide a primary aerosol stream of enlarged particles;

a detection chamber connected to said condensing means to receive said primary aerosol stream;

optical means defining an incident radiation beam passing into said detection chamber, said radiation beam forming a scattered light path at an angle to said incident radiation path; and means for detecting the intensity of the radiation in said scattered light path.

2. The method of determining the concentration of a solution in which the vapor pressure of the solvent is greater than the vapor pressure of the solute comprising the steps of:

atomizing a solution of a soluble dissolved in a solvent into an aerosol stream;

heating said aerosol stream above the boiling point of said solvent to evaporate said solvent and provide a stream of solvent vapor and solute particles;

cooling said stream below the dew point of said solvent for condensing said solvent vapor onto said solute particles to enlarge the size of said solute particles;

passing radiation through the stream of enlarged particles; and measuring the intensity of the scattered radiation.

References Cited

UNITED STATES PATENTS

| | | | |
|---|---|---|---|
| 2,797,336 | 6/1957 | Loft | 250—238 X |
| 3,010,308 | 11/1961 | Skala | 88—14 X |
| 3,320,428 | 5/1967 | Wagstaffe et al. | 250—218 |
| 3,322,960 | 5/1967 | Geniesse | 250—218 |
| 3,354,317 | 11/1967 | Gamble et al. | 250—218 |

WALTER STOLWEIN, Primary Examiner

U.S. Cl. X.R.

356—103